US008234565B2

(12) United States Patent
Sako et al.

(10) Patent No.: US 8,234,565 B2
(45) Date of Patent: Jul. 31, 2012

(54) INFORMATION PRESENTATION METHOD, INFORMATION PROCESSING APPARATUS, AND RECORDING MEDIUM

(75) Inventors: Yoichiro Sako, Tokyo (JP); Itaru Kawakami, Kanagawa (JP); Mitsuru Takehara, Tokyo (JP); Takatoshi Nakamura, Ibaraki (JP); Yuichi Abe, Tokyo (JP); Motoyuki Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 720 days.

(21) Appl. No.: 11/827,221

(22) Filed: Jul. 11, 2007

(65) Prior Publication Data

US 2008/0022199 A1    Jan. 24, 2008

(30) Foreign Application Priority Data

Jul. 18, 2006    (JP) .................................. 2006-195170

(51) Int. Cl.
    *G06F 17/30* (2006.01)
(52) U.S. Cl. ....................................... 715/237; 715/200
(58) Field of Classification Search .................... 715/273
    See application file for complete search history.

(56) References Cited

U.S. PATENT DOCUMENTS

| 7,689,431 B1* | 3/2010 | Carmel et al. ................. 705/1.1 |
| 2002/0046062 A1* | 4/2002 | Kameda ............................. 705/3 |
| 2002/0077755 A1* | 6/2002 | Hirai ................................ 702/19 |
| 2004/0208365 A1* | 10/2004 | Loui et al. ..................... 382/171 |
| 2005/0289482 A1* | 12/2005 | Anthony et al. .............. 715/851 |
| 2006/0250419 A1* | 11/2006 | Shiba et al. ................... 345/619 |
| 2007/0024722 A1* | 2/2007 | Eura et al. ................... 348/231.2 |

FOREIGN PATENT DOCUMENTS

| JP | 10-162078 A | 6/1998 |
| JP | 11-066049 | 3/1999 |
| JP | 11-249640 | 9/1999 |
| JP | 2000-056886 A | 2/2000 |
| JP | 2002-044555 | 2/2002 |
| JP | 2004-328265 A | 11/2004 |
| JP | 2005-004695 A | 1/2005 |
| JP | 2005-352773 A | 12/2005 |

* cited by examiner

*Primary Examiner* — Laurie Ries
*Assistant Examiner* — Tionna Smith
(74) *Attorney, Agent, or Firm* — Wolf, Greenfield & Sacks, P.C.

(57) ABSTRACT

The present invention provides an information presentation method for presenting specific information in a basic presentation frame image on a display, the method comprising the steps of: indicating a time axis in the basic presentation frame image in one direction of the basic presentation frame image; providing a presentation area extended along the time axis in the basic presentation frame image; and presenting the specific information in the presentation area at a location along the time axis indicated by and corresponding to chronological information pertained to the specific information.

19 Claims, 7 Drawing Sheets

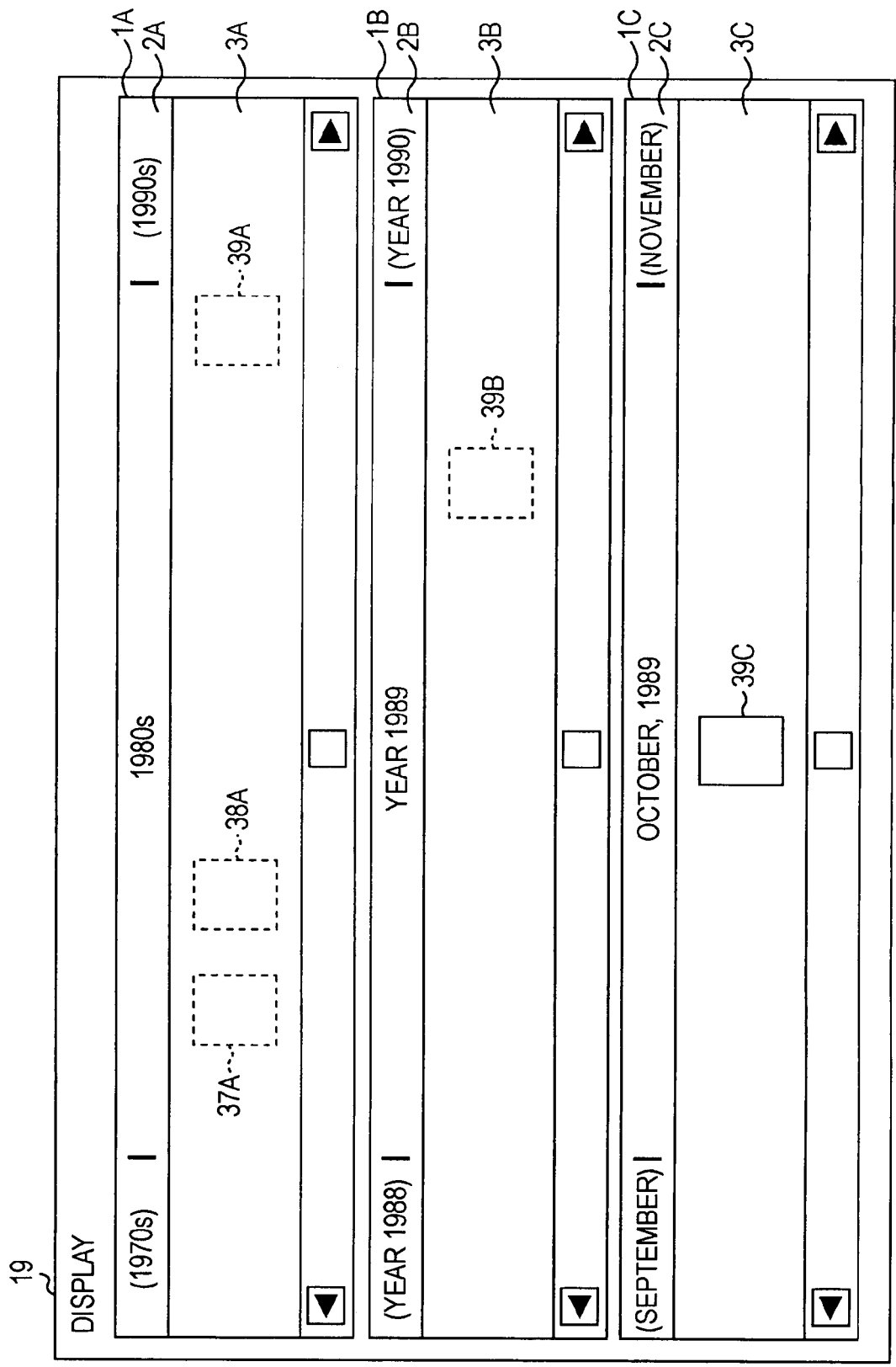

INFORMATION PRESENTATION METHOD, INFORMATION PROCESSING APPARATUS, AND RECORDING MEDIUM

CROSS REFERENCES TO RELATED APPLICATIONS

The present invention contains subject matter related to Japanese Patent Application JP 2006-195170 filed in the Japan Patent Office on Jul. 18, 2006, the entire contents of which are incorporated herein by reference.

BACKGROUND OF THE INVENTION

1. Field of the Invention

The present invention relates to a method for presenting information such as content and files on a display screen, and an apparatus therefor.

2. Description of the Related Art

As a method for presenting various kinds of information which are stored in a local medium or on an external network such as the Internet, including but not limited to, music content, video content, factual information that indicates facts and events such as news, or file data such as image files or document files which are created by user, there are known techniques that display an icon for each piece of information or display each information itself arranged in the order of dates or names.

As a specific example, for the historic event "lunar landing of Apollo 11 in July, 1969", information itself is displayed in a chronological table.

Japanese Unexamined Patent Application Publication No. 11-249640 discloses that the personal history of user from his birth to present day is displayed in the format of a chronological table data that consists of a pair of date-and-time data and event data, where the personal history is sectioned into blocks of several years, such as the period from an age of zero to an age of four, the period from an age of five to an age of nine, the period from an age of ten to an age of fourteen, and so forth.

Japanese Unexamined Patent Application Publication No. 11-66049 discloses that, upon reception of a request for displaying of a chronological table from a user terminal that is connected to a server via a network, the server reads personal history information of the source of the request out of personal event database and reads history information out of history event database so as to create data for displaying the chronological table in which these information are arranged in correspondence with each other, and then transmits the generated data to the user terminal, which is the request source.

When one file or a plurality of files contained in a folder is/are presented on a personal computer (PC), an icon that indicates the file or icons each of which indicates the corresponding file is/are displayed in a presentation window for the folder in one line or column or in a plurality of lines or columns arranged in the order of file names thereof or the dates of file creation/update thereof.

In such a presentation, when a new file is created on a PC or an existing file is acquired anew from a local storage device or via a network to add the file to the folder, or when an existing file that belongs to another folder is moved or copied to the first-mentioned folder through drag and drop of the icon on the PC, the icon that indicates the newly-created, acquired, moved or copied file is displayed at a position that is determined by the file name or the file creation/update date thereof in the presentation window of the folder so as to move the display position of all icons indicating other files that are posterior to the first-mentioned file, that is, the newly-created, acquired, moved or copied one, behind the icon of the first-mentioned file.

Japanese Unexamined Patent Application Publication No. 2002-44555 discloses that, as a method for controlling information display, the streaming video of video content now under replay is displayed in the video display area of a displayed screen image, the complete information of video content that is currently selected with a selection cursor is displayed in the detail information area thereof, and the icon image of the video content now under selection is displayed in the selected video display area thereof, where a mark indication of "now under replay" is affixed to the icon of video content which is currently being replayed, a mark indication of "viewed" is affixed to the icon of video content which has already been viewed by user, and the icon of video content whose media data has been deleted is displayed in a faint color or in gray.

SUMMARY OF THE INVENTION

According to chronological table display offered by the above conventional approaches, since chronological data is generated from existing information for the display of a chronological table, it is difficult to add any new information to the chronological table to display the added information at a suitable position in terms of time; that is, in order to do so, it undesirably requires the rewriting of the overall chronological table data.

The same problem holds true also when files contained in a folder are presented on a PC, etc., through display of icons thereof. That is, if it is assumed that icons are arranged in the order of file creation/update dates, when a file is added to the folder through new creation, acquisition, moving or copying thereof, although the icons of the files that belong to the folder, including that of the newly-created, acquired, moved or copied one, are arranged in the order of file creation/update date, it is difficult to arrange and display them at positions in terms of time corresponding to the respective file creation/update dates because they are arranged at certain intervals.

For this reason, according to information presentation offered by chronological table display or icon display of the related art, it is difficult for user to intuitively know the state/item/event, etc. at a certain position in time, such as month and year or date, month, and year, on a time axis such as a chronological axis.

In order to address the above-identified problem among others, the present invention offers information presentation that allows user to intuitively know the state/item/event, etc. at a certain position in time, such as month and year or date, month, and year, on a time axis such as a chronological axis.

An information presentation method according to an embodiment of the present invention is a method for presenting specific information in a basic presentation frame image on a display, the method comprising the steps of: indicating a time axis in the basic presentation frame image in one direction of the basic presentation frame image; providing a presentation area extended along the time axis in the basic presentation frame image; and presenting the specific information in the presentation area at a location along the time axis indicated by and corresponding to chronological information pertained to the specific information.

According to the above information presentation method, for example, if it is assumed that a chronological axis that shows calendar years at certain periodical intervals is displayed as the time axis, the information to be presented is an icon or a text that corresponds to each content, and that information indicating the month and year of release of the content for sale of or the date of acquisition thereof is affixed as the time information, each of the icons and/or texts that represents the corresponding content is presented in the presentation area of the presentation window display at a position in time, viewed along the chronological axis, that corresponds to the month and year in which the corresponding content was released for sale or acquired. Thus, it is possible for user to intuitively know the state of release of the content for sale or acquisition thereof in each month and year.

As described above, according to the present invention, it is possible to present information so that user is able to intuitively know the state/item/event, etc. at a certain position in time, such as month and year or date, month, and year, on a time axis such as a chronological axis.

BRIEF DESCRIPTION OF THE DRAWINGS

FIG. 7 is a schematic diagram that illustrates an example of a presentation mode for a case where a plurality of presentation window displays is presented concurrently.

DESCRIPTION OF THE PREFERRED EMBODIMENTS

1. System Configuration

Figure 1:
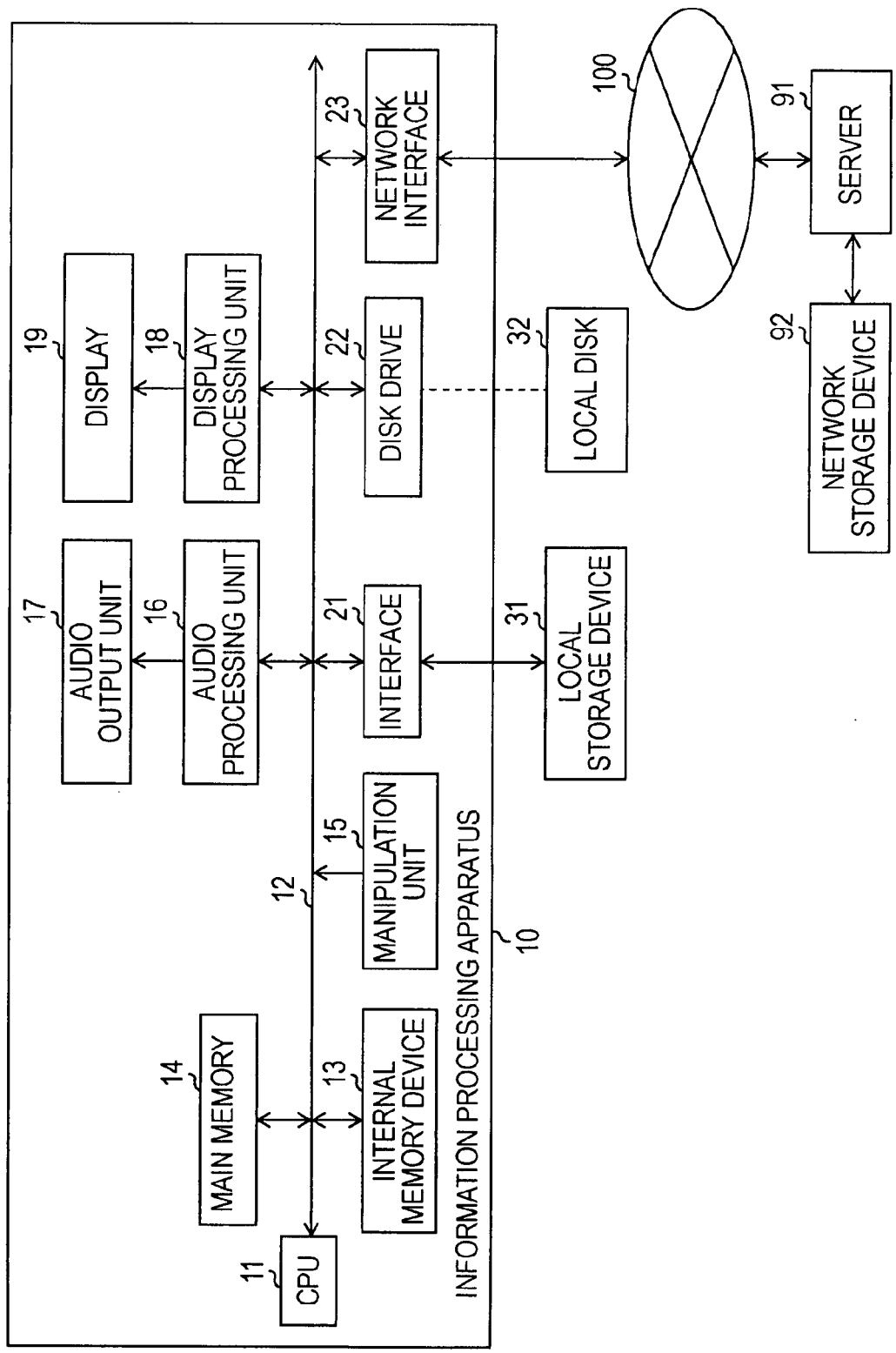
FIG. 1 is a block diagram that schematically illustrates an example of a system according to an embodiment of the present invention.

FIG. 1 schematically illustrates an example of a system that implements an information presentation method according to an embodiment of the invention.

In the illustrated exemplary system, an information processing apparatus 10 located at user side is connected to a server 91 via the Internet 100.

The information processing apparatus 10 is provided with functions of information processing and connection to the Internet 100 as in PCs, and so on, and is further provided with a function of replaying content, for example, replaying of music based on music data, replaying of video (reproducing of image) based on video data (image data).

Specifically, the information processing apparatus 10 has a CPU 11, which is interconnected via bus 12 to an internal memory device 13 such as hard disk in which various programs containing, including but not limited to, an information presentation program described later and various information (data) such as content and file are stored. In addition, a main memory 14, in which programs and data are expanded, is connected to the bus 12 for interconnection therewith.

Moreover, a manipulation unit 15 is connected to the bus 12; and an audio output unit 17 is connected to the bus 12 with an audio processing unit 16 interposed therebetween, whereas a display 19 is connected to the bus 12 with a display processing unit 18 interposed therebetween.

The audio processing unit 16 functions to decode audio data such as music data and convert the decoded data into an analog signal. An example of the audio output unit 17 is an audio amplification circuit and a speaker system (headphones). The display processing unit 18 functions to decode image data (video data) and/or to process display data for a screen such as a presentation window display and so on. An example of the display 19 is a liquid crystal display, or an organic electroluminescent (EL) display for image display and/or video display.

Furthermore, the bus 12 is further interconnected to an interface 21 that is provided for connecting the information processing apparatus 10 to an external local storage device 31, to a disk drive 22 that is provided for driving a local disk 32 such as a CD, DVD, etc., inserted into the information processing apparatus 10, and to a network interface 23 that is provided for connecting the information processing apparatus 10 to the Internet 100.

The local storage device 31 and the local disk 32 have information such as content, files, etc., stored therein. The information is read out of the local storage device 31 and the local disk 32 into the information processing apparatus 10.

The server 91 offers information on the Internet 100 to distribute content. A network storage device 92, in which information such as various kinds of content, files, etc., is stored, is connected to the server 91.

2. Information Presentation Method

When presenting information stored in the internal memory device 13, the local storage device 31, the local disk 32, or the network storage device 92 in the exemplary system illustrated in FIG. 1, a presentation window display is shown on the display 19 for presentation of information as explained below.

2-1. An Exemplary Mode of Information Presentation

Figure 2:
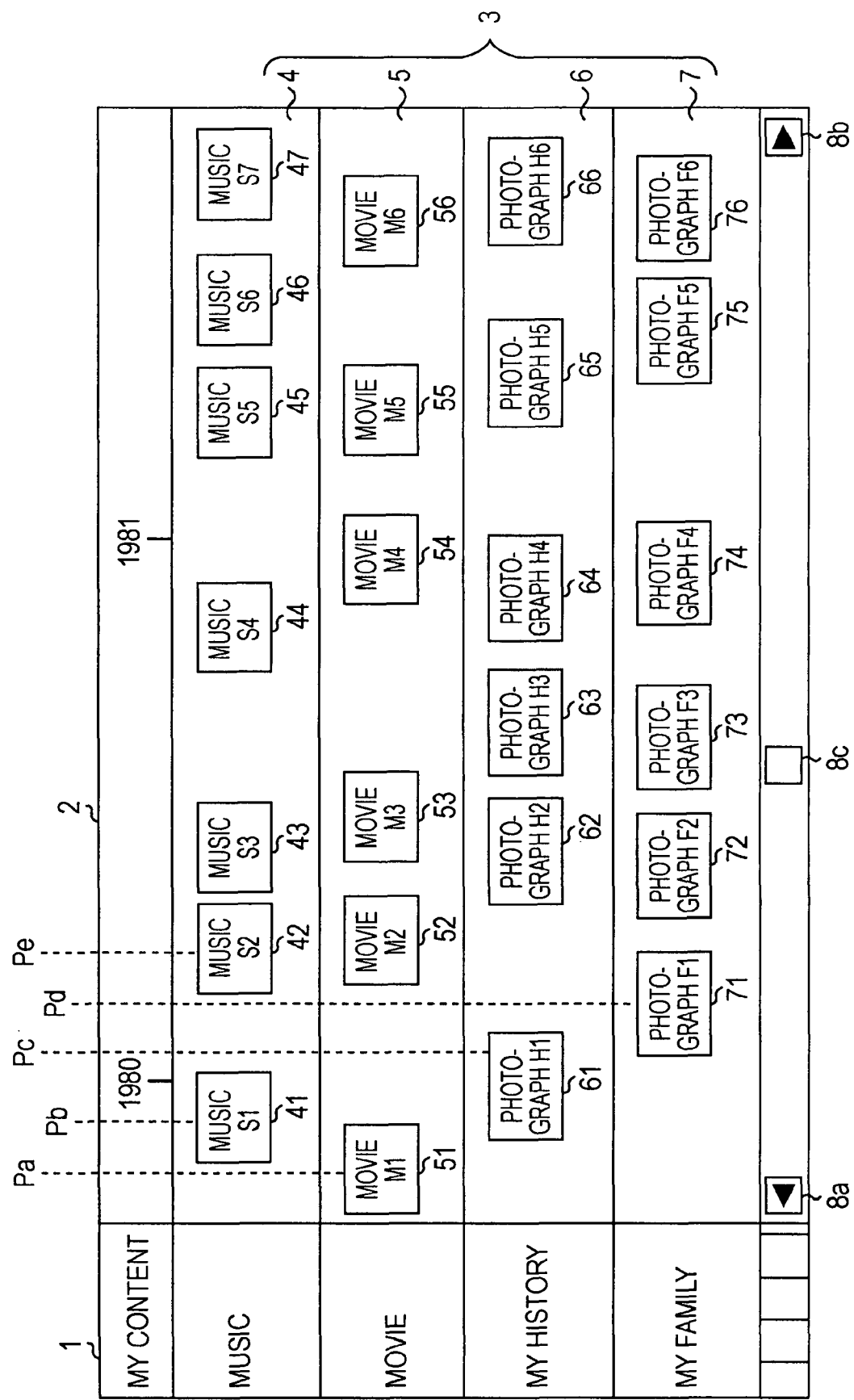
FIG. 2 is a schematic diagram that illustrates an example of a presentation mode of information.

FIG. 2 schematically illustrates an example of a mode of information presentation.

The present exemplary mode explains the presentation of files contained in a folder that is stored under the folder name of "My Content" in the internal memory device 13 or the local storage device 31.

As a presentation window display 1, an image that contains a time axis 2 extending in a horizontal direction at the upper end thereof and presentation area 3 provided under the time axis 2 and along the axial direction thereof is shown on the display 19.

In this example, it is assumed that the time axis 2 represents a chronological axis that shows calendar years at certain periodical intervals, such as years 1980, 1981, . . . and so on.

In addition, according to this example, it is assumed that the "My Content" folder contains subfolders having the names of "Music", "Movie", "My History", and "My Family", where the presentation area 3 is divided into four sub-areas 4, 5, 6, and 7 in the vertical direction of the presentation window display 1, and the names of the above four subfolders are shown respectively at the corresponding left ends of the presentation window display 1 to indicate the types of information to be presented.

Each music file (music data) contained in the "Music" folder is presented on the presentation window display 1 by showing one of the icons 41, 42, . . . 47, each of which indicates the corresponding music file, in the area 4.

Each movie file (video data and audio data of a movie) contained in the "Movie" folder is presented on the presentation window display 1 by showing one of the icons 51, 52, ... 56, each of which indicates the corresponding movie file, in the area 5.

Each photograph file (still picture data) contained in the "My History" folder is presented on the presentation window display 1 by showing one of the icons 61, 62, ... 66, each of which indicates the corresponding photograph file, in the area 6.

Each photograph file (still picture data) contained in the "My Family" folder is presented on the presentation window display 1 by showing one of the icons 71, 72, ... 76, each of which indicates the corresponding photograph file, in the area 7.

In such a presentation, time information that indicates date, month, and year related to each file is affixed thereto; for example, time information indicating "Dec. 1, 1979", which is the date of the release of the music S1 for sale, is affixed to the music file presented by means of the icon 41; time information indicating "Nov. 1, 1979", which is the date of the screening of the movie M1, is affixed to the movie file presented by means of the icon 51; time information indicating "Jan. 15, 1980", which is the date of the photographing of the picture H1, is affixed to the picture file presented by means of the icon 61; and time information indicating "Feb. 15, 1980", which is the date of the photographing of the picture F1, is affixed to the picture file presented by means of the icon 71.

Then, each icon indicating the corresponding file is displayed at a time position, which is indicated by the time information affixed to the file, along the direction of the horizontal axis 2 (the left-right direction of the screen) inside the corresponding one of the areas 4-7.

For example, the icon 41 is displayed at a position Pb that corresponds to "Dec. 1, 1979" in the area 4 when the time information affixed to the corresponding music file that is presented by the icon 41 indicates "Dec. 1, 1979" as described above. The icon 51 is displayed at a position Pa that corresponds to "Nov. 1, 1979" in the area 5 when the time information affixed to the corresponding movie file that is presented by the icon 51 indicates "Nov. 1, 1979" as described above. The icon 61 is displayed at a position Pc that corresponds to "Jan. 15, 1980" in the area 6 when the time information affixed to the corresponding photograph file that is presented by the icon 61 indicates "Jan. 15, 1980" as described above. Finally, the icon 71 is displayed at a position Pd that corresponds to "Feb. 15, 1980" in the area 7 when the time information affixed to the corresponding photograph file that is presented by the icon 71 indicates "Feb. 15, 1980" as described above.

If month and year only is indicated as the time information, meaning that no specific day is indicated thereby, an icon is displayed while assuming that the missing day of the time information thereof should be the first of the month or the fifteenth of the month. For example, if the time information affixed to the corresponding music file that is presented by the icon 42 indicates "March, 1980", the icon 42 is displayed at the position Pe, which corresponds to "Mar. 15, 1980" in the area 4.

If year only is indicated as the time information, meaning that no specific day and month is indicated thereby, an icon is displayed while assuming that the missing day and month of the time information thereof should be the very first of the year, that is, January 1 of the year, or the middle of the year, that is, July 1 of the year. Alternatively, in such a case, the icon indicating the corresponding file with the missing day and month is displayed at a specially allocated area of the presentation window display 1. Further alternatively, an alert message is issued to user to notify him/her that time information is incomplete because there is not any sufficient time information affixed to the corresponding file, or the system prompts user to input time information in such an occasion. It should be noted that, according to the above example illustrated in FIG. 2, the display position of each file (content) is determined by the corresponding time position indicated by the time information affixed to each thereof while taking the center of each icon as the reference position thereof. Notwithstanding the above, for example, the left edge of each icon may alternatively be taken as the reference position thereof. In such an alternative configuration, it is preferable that the criteria of the reference position (e.g. the center, the left edge) be uniformly adopted, not varying from one icon to another.

The title of content such as a song title or the name of a file is displayed inside the icon or at a position immediately over or under the icon.

In addition to the above, the presentation window display 1 is provided with scroll buttons 8a, 8b, and 8c at the lower end thereof. Upon manipulation of the scroll button 8a, 8b, or 8c by user, the time axis 2 together with the presentation area 3 are scrolled in such a manner that new years appear while old years disappear, or conversely, old years appear while new years disappear in accordance with the user manipulation. As they scroll, icons displayed in each of the areas 4-7, or in other words, files presented thereby in each of the areas 4-7 change.

As the initial presentation window display 1 that appears at its first view, a portion of the chronological display whose corresponding years displayed on the time axis 2 are nearest to the present day is displayed. Alternatively, it may be configured that a portion of the chronological display whose corresponding years displayed on the time axis 2 are farthest to the present day is displayed.

It may be configured that one folder that actually contains a plurality of files or could contain a plurality of files may be presented by means of one icon.

In FIG. 2, as an example of such a configuration, it is assumed here that the "My History" folder contains a "The First Wedding Anniversary" subfolder, and the "My Family" folder contains a "Birth of Taro" subfolder, where the icon 61 denotes the "The First Wedding Anniversary" folder, and the icon 71 denotes the "Birth of Taro" folder, respectively.

In such a case, only one time information is affixed to one folder as a whole, named as the "The First Wedding Anniversary" or "Birth of Taro". Alternatively, it may be configured that each file contained in the above one folder may be assigned its time information on an individual basis.

In the above example, when time information is affixed to each file, it is not always necessary for each of time information to indicate the same day, month, and year as that indicated by others. That is, it may be configured that time information affixed to a certain file indicates Jan. 13, 1980, whereas another time information affixed to another file indicates Jan. 17, 1980, as long as they indicate dates that are close to each other. If so configured, for example, the average of dates indicated by the respective time information affixed to the respective files may be taken as the time position where the folder containing these files should be presented. Alternatively, it may be configured that the day, month, and year of the oldest one among these files may be taken as the time position where the folder containing these files should be presented.

According to the example described above, it is assumed that the information processing apparatus 10 presents information stored in the internal memory device 13 or the local storage device 31 through user manipulation. Without any limitation to the foregoing, however, the same holds true for a case where user accesses to information located on the Internet 100.

More specifically, upon reception of a request for presentation of information from the information processing apparatus 10, connected to the server 91, to the server 91, data for showing a presentation window display that is the same as or similar to the presentation window display 1 illustrated in FIG. 2 is sent from the server 91 to the information processing apparatus 10 so that the presentation window display that is the same as or similar to the presentation window display 1 illustrated in FIG. 2 appears on the display 19.

In such a presentation, a title such as "Recommended Pops", "Foreign Movies in 1980s", and so on, is shown in the present window display. In addition thereto, the content presented in the presentation area of the presentation window display is one having the presented title among many other content stored in the network storage device 92.

In addition, the system may be further configured so as to allow user to acquire content by paying charge therefor through purchase of the presented content, etc., or acquire it for free, thereby making it possible for the information processing apparatus 10 to receive content data transmitted from the server 91 to perform streaming replay thereof or to store the downloaded content data into the internal memory device 13 or the local storage device 31 therein.

2-2. Addition of Information to be Presented

As illustrated in FIG. 2, when a certain folder is present, as user acquires or creates a new file and add it to the folder, or s/he adds a file that belongs to another folder to the first-mentioned folder through manipulation on the information processing apparatus 10, the added file is also presented in the manner shown in FIG. 2.

The addition of a file to the target folder is performed in accordance with any of the following methods <1>-<4>.

<1> As described above, user acquires content anew through the Internet 100 so as to add the acquired file to the folder, and store it into the internal memory device 13 or the local storage device 31.

<2> Through so-called "ripping" (digital audio extraction), a certain music file is extracted out of the local disk 32 into the information processing apparatus 10 so as to add the extracted file to the folder, and store it into the internal memory device 13 or the local storage device 31.

<3> Through drag and drop user manipulation of the icon of a file that has already been stored in the internal memory device 13 or the local storage device 31 but belongs to another folder, the file is moved to the first-mentioned (i.e. target) folder; or the file is copied to the first-mentioned folder through copying manipulation. When viewed from a folder that is designated as the destination of the moving of a file, the moving of a file is nothing more than a variation of file addition.

<4> A new image file, a new text file, or any other new file is created on the information processing apparatus 10; and then, the newly-created file is added to the folder to be stored into the internal memory device 13 or the local storage device 31.

Figure 3:
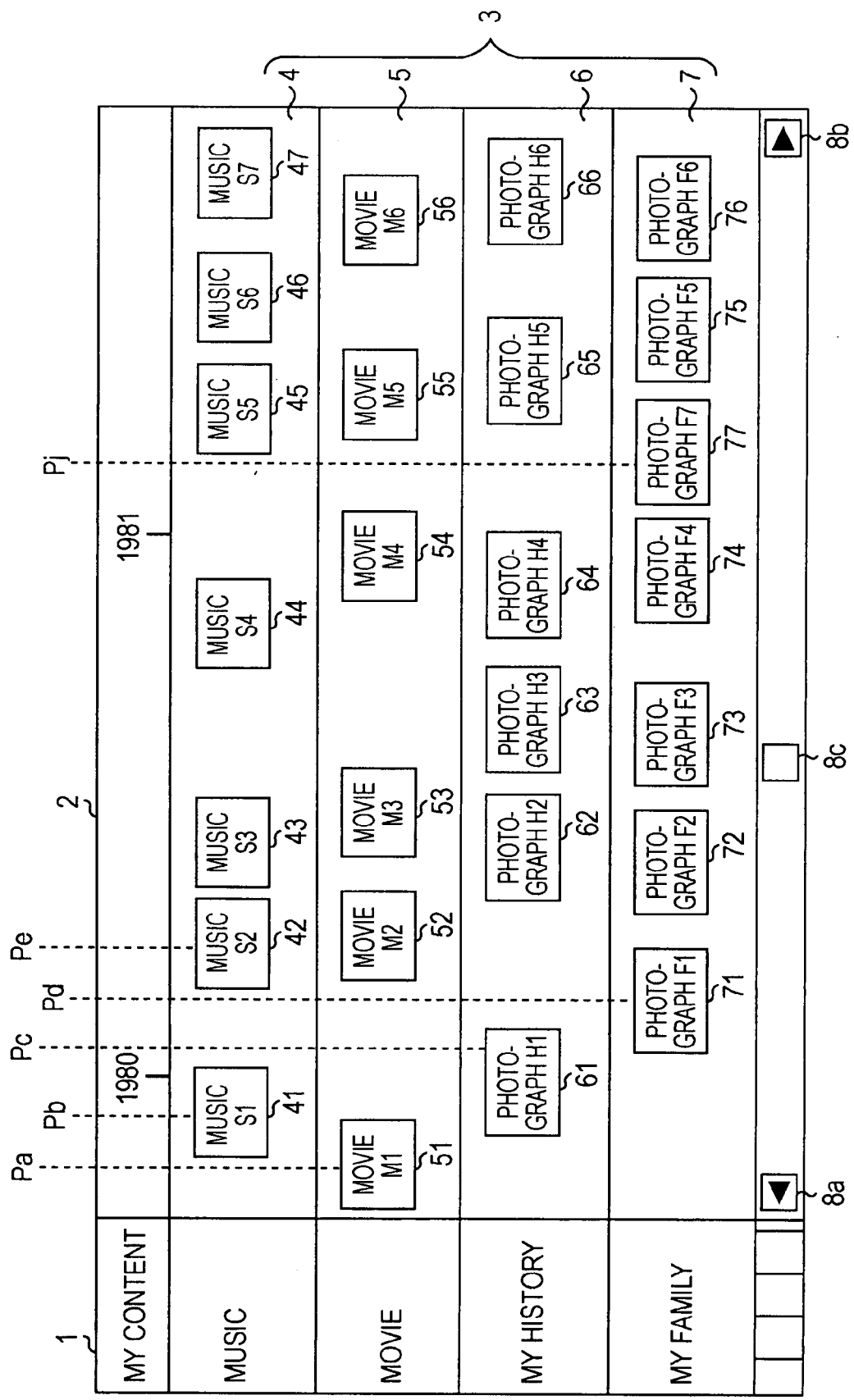
FIG. 3 is a schematic diagram that illustrates an example of a presentation mode for a case where information to be presented is added.

FIG. 3 schematically illustrates an example of presentation of an added file when the file is added to "My Content" folder having a configuration illustrated in FIG. 2.

This example illustrates a case where a photograph file presented by the icon 77 is added to the "My Family" folder.

According to this example of file addition, as time information affixed to the added photograph file indicates "Feb. 1, 1981", the icon 77 is displayed at the position Pj, that is, the position corresponding to "Feb. 1, 1981" in the area 7.

2-3. Exemplary Case where there is not Sufficient Space for Presentation

When one folder contains two or more files whose affixed time information indicates dates that are close to each other, in some cases, it is possible that there is not enough space for presenting one of such files at the supposed display position in the presentation area of the presentation window display, that is, space for displaying the icon representing the file due to the presence of any other file/icon.

In such a case, the target file is presented in such a manner that it is superposed at a position where other file will be presented, or at a position where other file has already been presented.

Figure 4:
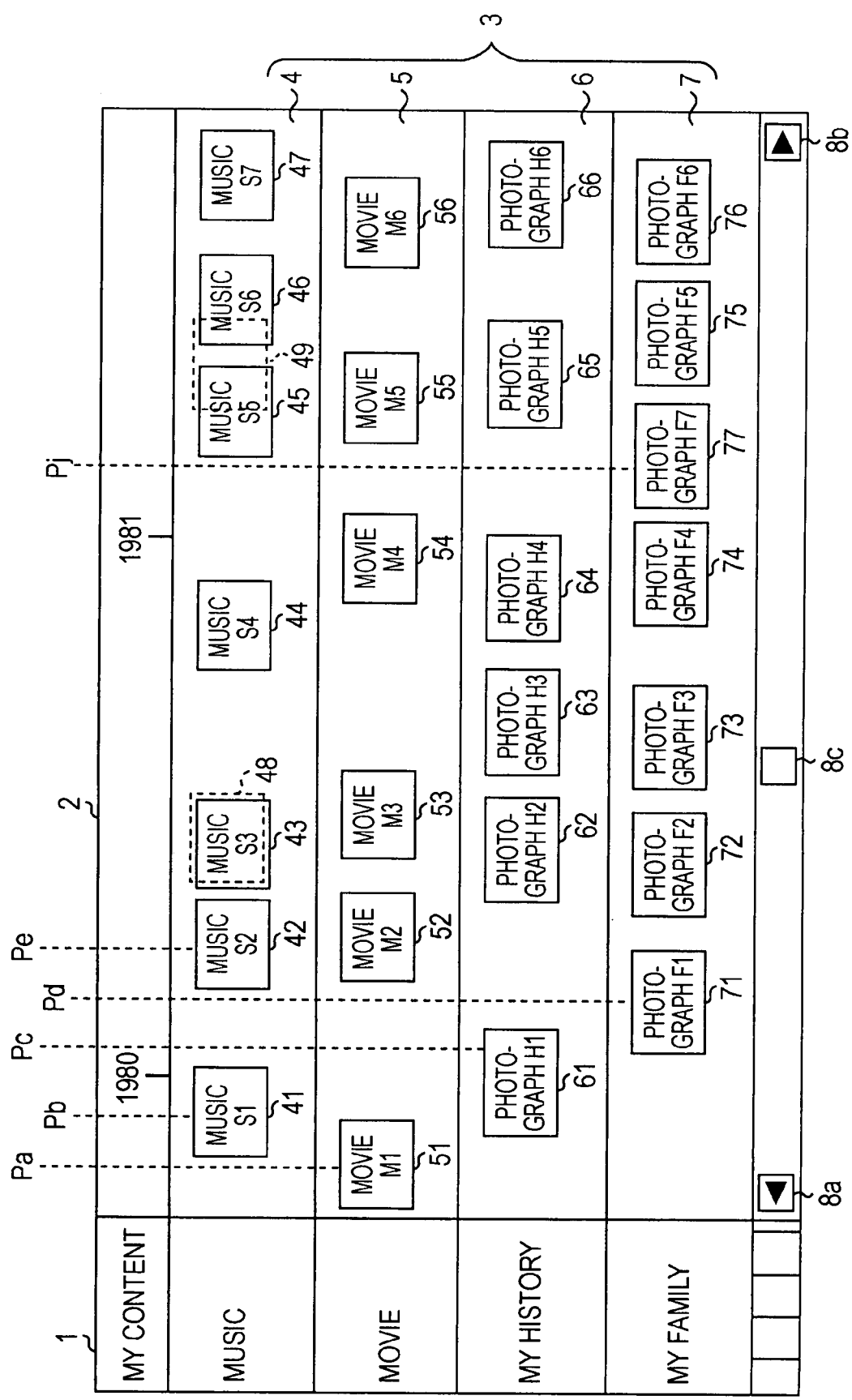
FIG. 4 is a schematic diagram that illustrates an example of a presentation mode for a case where information is superposed at a position where another information is presented.

FIG. 4 schematically illustrates an example thereof. This example shows a case where music files presented by the icons 48 and 49 are added to the "Music" folder in the "My Content" folder having a configuration illustrated in FIG. 3, respectively.

Herein, it is assumed that both of time information affixed to the music file presented by the icon 48 and time information affixed to the music file presented by the icon 43 indicate "May 15, 1980". For this reason, the icon 48 is superposed on the icon 43 for display thereof. In such a case, it is preferable that the whole of or at least a part of the icon 43 is visible by making the icon 48 semitransparent, or shifting the icon 48 in an upward direction or in a downward direction with respect to the icon 43.

On the other hand, it is assumed that time information affixed to the music file presented by the icon 49 indicates "May 1, 1981", meaning that the icon 49 is supposed to be displayed between the icons 45 and 46; however, there is no sufficient space for displaying any more icon between the icons 45 and 46. For this reason, the icon 49 is displayed in such a manner that its left end portion is superposed on the right end portion of the icon 45 to partially overlap therewith, whereas its right end portion is superposed on the left end portion of the icon 46 to partially overlap therewith. Also in this case, it is preferable that the icon 49 is configured to be semitransparent, or is shifted in an upward direction or in a downward direction with respect to the icons 45 and 46.

As an alternative configuration, the target file may be presented at a peripheral position with respect to the position where other file has already been presented or at a peripheral position with respect to the position where other file will be presented if the area 4 has a sufficient size in a vertical direction. More specifically, for example, if the area 4 has a sufficient size in a vertical direction, it may be configured that the icon 48 is displayed above or below the position of the icon 43 in the area 4 without superposing the icon 48 on the icon 43, or the icon 48 is displayed above or below the positions of the icons 45 and 46 in the area 4 without partially overlapping the icon 48 on the icons 45 and 46.

It should be noted that the size of the icon and the dimension of the time axis 2 are assumed to be constant in this exemplary case; and it may be configured that user can arbitrarily select, for example, between a 2-year presentation mode where the length of time represented by the time axis 2 corresponds to 2 years as illustrated in FIG. 4 or a 1-year presentation mode where the length of time represented by the time axis 2 corresponds to 1 year.

According to such a configuration, in the latter presentation mode, it is possible to display the icon 49 without overlapping it with the icons 45 and 46 because there is enough space for placing the icon 49 between the icons 45 and 46.

2-4. Exemplary Case where no Time Information is Affixed

Although time information that indicates a presentation position is generally affixed to each file to be presented at the time of creation thereof, in some cases, it is possible that there is not any time information affixed to some kind of files such as an existing file, and so on.

When no time information is affixed to a target file that is to be presented, as a first solution, the information processing apparatus 10 issues an alert to user to the effect that no time information is affixed thereto or prompts user to input missing time information at the time of acquisition or presentation of the file.

More specifically, such an alert message or an input-prompt message is issued as a written message "Please enter your desired date on this file." shown on the display 19, or as a voice message of the same content that is outputted from the audio output unit 17, thereby inviting the user to input day, month, and year.

Upon reception of user input of the missing date in accordance with the alert or the prompt request, the information processing apparatus 10 generates time information to affix the generated time information to the target file. If the user does not input the missing date, the following second approach is taken.

As the second solution, the information processing apparatus 10 presents the target file at a specially allocated area of the presentation window display at the time of execution of presentation.

Figure 5:
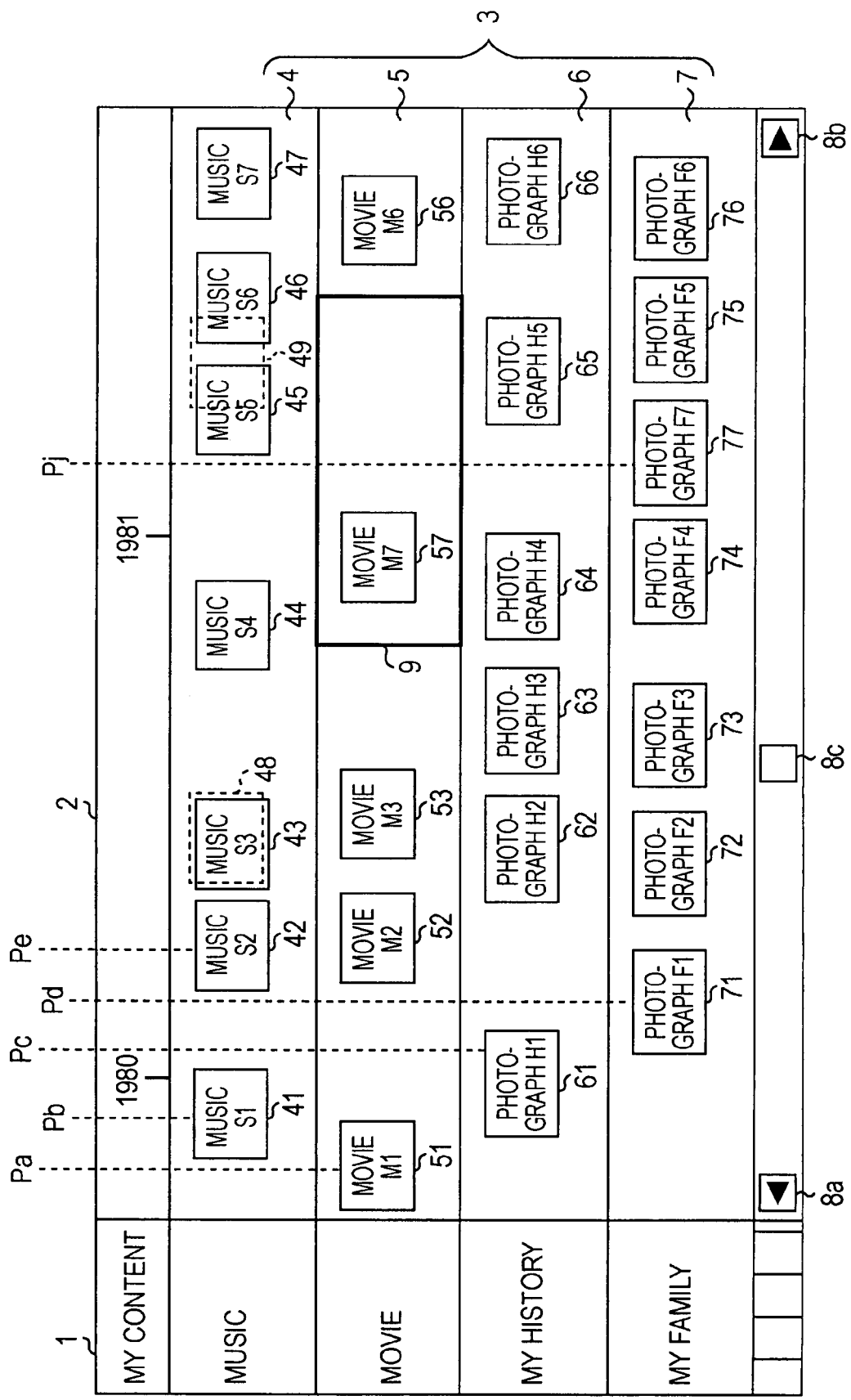
FIG. 5 is a schematic diagram that illustrates an example of a presentation mode for a case where no time information is affixed.

For example, as illustrated in FIG. 5, if no time information is affixed to a movie file that is to be presented in the area 5, a part of the area 5 is designated as a specially allocated area 9 so that the icon 57 that indicates the movie file is displayed in the area 9.

In such a presentation, it is preferable that a message "The presentation position of this file can not be identified." is displayed in the area 9 so as to notify the above alert or prompt request to the user.

Upon reception of user input of the missing date on the target file, the information processing apparatus 10 generates time information so as to affix the generated time information to the target file, and then deletes the area 9 and displays the icon 57 at a time position that is indicated by the generated time information in the area 5.

It should be noted that the area 9 as well as the icon 57 displayed in the area 9 continues to be displayed on a fixed position on the presentation window display 1, meaning that it does not disappear, even when user performs scrolling through manipulation of the scroll buttons 8a, 8b, and 8c.

2-5. Information Presentation Processing

Figure 6:
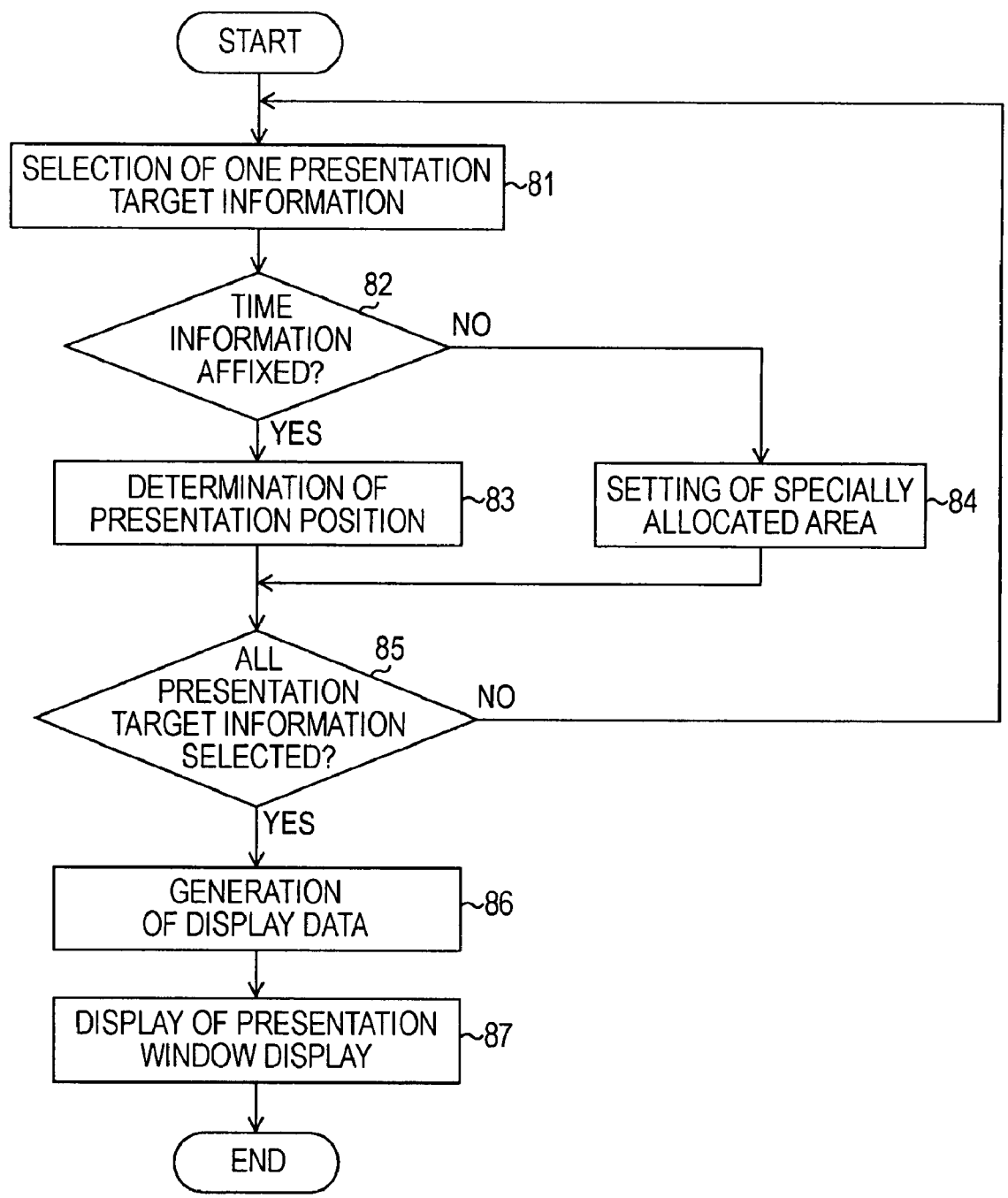
FIG. 6 is a flowchart that illustrates an example of information presentation processing.

FIG. 6 illustrates an example of information presentation processing that is executed by the CPU 11 of the information processing apparatus 10 when the above-described information processing is implemented.

According to exemplary information presentation processing in this example, an overall processing routine is initiated so as to present one or more presentation target information (i.e. information that is to be presented), where, firstly, in step S81, one piece of presentation target information is selected. The order of selection may be arbitrary.

Next, at step S82, a decision is made to judge whether the above-described time information is affixed to the selected presentation target information or not. If it is judged that there is time information affixed thereto, the process moves on to step S83, where the presentation position of the selected presentation target information is determined based on the affixed time information, and the process goes to step S85.

On the other hand, if it is judged that no time information described above is affixed to the selected presentation target information, the process moves from the step S82 to the step S84 so as to set a specially allocated area on the presentation window display described above; and then, the process goes on to the step S85.

At the step S85, a decision is made to judge whether all of the presentation target information has been selected or not. If it is judged that the selection has not been completed yet and thus that there is any other presentation target information that remains to be selected, the process returns from the step S85 to the step S81 to select one of the remaining piece(s) of presentation target information; and the above-described processing executed at the steps S82 (decision), S83, and S84 are iterated on the additionally selected presentation target information.

On the other hand, if it is judged that all of the presentation target information has been selected, the process moves from the step S85 on to step S86, where data for showing a presentation window display in which each icon that represents a corresponding one of the presentation target information is placed at time position that is indicated by time information affixed to the presentation target information or placed in the specially allocated area described above depending on the result of processing done at the step S83 or at the step S84. Then, the generated data is stored in a display memory provided in the display processing unit 18. Subsequently, the process goes to step S87, where a presentation window display, several examples of which are illustrated in FIGS. 2-5, is shown on the display 19 based on the display data.

2-6. Another Exemplary Mode of Information Presentation

According to the above examples illustrated in FIGS. 2-5, information is presented while displaying a single presentation window display 1, or in other words, only one time axis 2. However, the present invention is not limited to such an exemplary embodiment. That is, the present invention may be configured so that a plurality of presentation window displays having length of time varying from one to another are shown concurrently, where the length of time is indicated by a predetermined dimension of the time axis shown on the display; and information to be presented is presented at least a part of or the whole of the respective presentation areas of the plurality of the presentation window displays.

FIG. 7 schematically illustrates an example of such a display. This example shows a case where three of presentation window displays, 1A, 1B, and 1C, are shown on the display 19.

The presentation window display 1A is configured to have the time axis 2A and the presentation area 3A, where the time axis 2A represents periods sectioned at intervals of ten years, such as, 1970s, 1980s, and 1990s. The presentation window display 1B is configured to have the time axis 2B and the presentation area 3B, where the time axis 2B represents periods sectioned at intervals of one year, such as, years 1988, 1989, and 1990. Finally, the presentation window display 1C is configured to have the time axis 2C and the presentation area 3C, where the time axis 2C represents periods sectioned at intervals of one month, such as, September, October, and November of year 1989.

In such a configuration, if time information that is affixed to a target file to be presented indicates Oct. 15, 1989, as illustrated in the figure, the time axis 2A shows 1980s, the time axis 2B shows the year 1989, and the time axis 2C shows October, 1989. In addition thereto, an icon(s) representing the target file is/are displayed as explained below.

According to a first approach, an icon 39C that represents the target file is displayed only at the position corresponding to "Oct. 15, 1989" in the presentation area 3C, meaning that no icon representing the target file is displayed in the presentation areas 3A and 3B.

According to a second approach, an icon 39A, an icon 39B, and the icon 39C representing the target file are displayed at the position corresponding to "Oct. 15, 1989" in the presentation areas 3A, 3B, and 3C, respectively.

As another alternative configuration, the icon may be displayed either in the presentation area 3A or 3B only. Alternatively, the icons may be displayed in any arbitrary two of these presentation areas.

It may be configured to allow user to arbitrary select either one of these approaches. As still another configuration, an icon that is displayed in a certain presentation area may be moved or copied to any other presentation area through manipulation by user after displaying of the icon.

Note that each of icons 37A and 37B shown in the presentation area 3A denotes a file that has been acquired or created aforetime.

As for scrolling of the presentation window displays 1A, 1B, and 1C, it is possible to adopt an automatic linked scroll method. More specifically, for example, if such an automatic linked scroll is employed, when user scrolls the window on the presentation window display 1A in such a manner that the time axis 2A shows 1990s, the presentation window displays 1B and 1C are also automatically scrolled in synchronization with the scrolling of the presentation area 1A so that the time axis 2B shows the year 1990, and that the time axis 2C shows the January, 1990; and subsequently, if user scrolls the window on the presentation window display 1B in such a manner that the time axis 2B shows year 1997, the presentation window display 1C is also automatically scrolled in synchronization with the scrolling of the presentation area 1B so that the time axis 2C shows the January, 1997.

2-7. Other Exemplary Embodiments of Information to be Presented and Presentation Thereof According to another embodiment of the present invention, it is possible to present any audio content other than music, moving-picture content other than movie, still-picture content other than photograph, and other content such as game software, electronic book, and so on, in the same manner as explained in the above embodiment. In addition, the present invention is not restricted to presentation of content. That is, the invention enables factual information that simply indicates facts and events (text) to be presented in the same manner as explained in the above embodiment. In such a case, it is possible to display not an icon but information itself or a part thereof. Although icons are taken as an example of display images according to the above embodiment of the present invention, if content such as a CD, DVD, and so on, is accompanied by a sleeve photograph, the size-reduced image (i.e. thumbnail image) thereof may be used.

Moreover, as another example configuration, time information indicating day, month, and year of the last replay of music or movie (i.e. the last time when user listened to music or viewed movie) may be affixed thereto so that an icon thereof is presented at the last replay date; and subsequently, the time information is automatically updated when user played back the music or the movie so that the time position of presentation is also subjected to automatic update. With such a configuration, it is possible for the user to intuitively know the latest replay history of each piece of music and/or movie.

Depending on a type(s) of information to be presented, the time axis on a presentation window display may represent (a) centuries such as the nineteenth century, the twentieth century, the twenty first century, and so on, (b) periods sectioned at intervals of ten years, as represented by the time axis 2A in FIG. 7, (c) periods sectioned at intervals of one calendar year, as represented by the time axis 2B in FIG. 7, (d) periods sectioned at intervals of one month so as to display both months and years, as represented by the time axis 2C in FIG. 7, (e) more exact time, for example, not only months and years but also days, hours, minutes, and seconds, or (f) any other concept arranged in the order of time.

An example of other concept arranged in the order of time represented by the time axis is the display of the ordinal session/competition number (or other ordinal number) and venue of events that are held periodically, for example, once in every four years, shown as, for example, "Host country of the 1st competition: France, Host country of the 2nd competition: England, Host country of the 3rd competition: Germany". Another example of such other concept arranged in the order of time represented by the time axis includes, but not limited to, "the first frame, the second frame, the third frame, ..." that constitute a period sectioned into a plurality of frames, "the first sample, the second sample, the third sample, ..." that constitute a period sectioned into a plurality of samples, just to name a few.

It should be understood by those skilled in the art that various modifications, combinations, sub-combinations and alterations may occur depending on design requirements and other factors insofar as they are within the scope of the appended claims or the equivalents thereof.

What is claimed is:

1. An information presentation method for presenting specific information corresponding to at least one media item of a plurality of media items in a basic presentation frame image on a display, the method comprising:

with at least one processor:

indicating, on the display, a time axis in the basic presentation frame image in one direction of the basic presentation frame image;

providing, on the display, a presentation area extended along the time axis in the basic presentation frame image;

in response to an attempt to present the specific information in the presentation area, when the at least one media item of the plurality of media items is associated with chronological information used to present the specific information in the presentation area in a chronological order, presenting the specific information in the presentation area at a location along the time axis indicated by and corresponding to the chronological information, wherein the presentation area is divided into a plurality of distinct sections each extending along the time axis and each presenting information corresponding to a category of media item, one of the plurality of sections presenting second information on a second media item from the plurality of media items that is stored in internal storage and third information on a third media item from the plurality of media items that is received from a server via a network; and when the at least one media item is not associated with the chronological information indicating a date of release for sale or acquisition of the at least one media item and used to present the specific information in the presentation area in the chronological order, providing an indication to the user indicating that the at least one media item is not associated with the chronological information.

2. The information presentation method of claim 1, wherein the act of presenting presents one of an icon and a thumbnail image corresponding to the specific information in the basic presentation frame image.

3. The information presentation method of claim 1, wherein the act of presenting presents all of the specific information or a part of the specific information.

4. The information presentation method of claim 1, further comprising:
dividing the basic presentation frame image into a plurality of sub-presentation frame images, each sub-presentation frame image including a time axis and a presentation area.

5. The information presentation method of claim 4, wherein a first time axis of a first sub-presentation frame image has a time scale different from a second time axis of a second sub-presentation frame image.

6. The information presentation method of claim 1, wherein when a proper location at which to present the specific information is shared by other information, the presenting step presents the specific information at a vacant location allocated for different information or at the proper location by placing the specific information partly on or under the other information.

7. The information presentation method of claim 1, wherein when a proper location to present the specific information is shared by other information, the presenting step presents the specific information at a vacant location allocated for different information or at a location near the proper location.

8. The information presentation method of claim 1, wherein, when the at least one media item is not associated with the chronological information, the indication provided to the user comprises a warning that the at least one media item is not associated with the chronological information and the method further comprises a request for an input of the chronological information.

9. The information presentation method of claim 1, further comprising presenting the specific information at a predetermined location when the at least one media item is not associated with the chronological information.

10. An information presentation apparatus comprising at least one processor for presenting specific information in a basic presentation frame image on a display, the apparatus comprising:
an acquiring unit configured to acquire the specific information; and
a controlling unit configured to:
with the at least one processor,
indicate, on the display, a time axis in the basic presentation frame image in one direction of the basic presentation frame image and a presentation area extended along the time axis in the basic presentation frame image,
when the specific information is associated with chronological information pertaining to the specific information and used to present the specific information in the presentation area in a chronological order, present the specific information acquired by the acquiring unit in the presentation area at a location along the time axis indicated by and corresponding to the chronological information, wherein the controlling unit divides the presentation area into a plurality of distinct sections each extending along the time axis and each presenting specific information relating to an information category, and
when the specific information is not associated with the chronological information, presenting the specific information in an area within the presentation area that is allocated to presenting information that is not associated with chronological information.

11. The information presentation apparatus of claim 10, wherein the controlling unit presents one of an icon and a thumbnail image corresponding to the specific information in the basic presentation frame image.

12. The information presentation apparatus of claim 10, wherein the controlling unit presents all of the specific information or a part of the specific information.

13. The information presentation apparatus of claim 10, wherein the controlling unit divides the presentation area into the plurality of sections for information category in a direction orthogonal to the time axis.

14. The information presentation apparatus of claim 10, wherein the controlling unit divides the basic presentation frame image into a plurality of sub-presentation frame images, each sub-presentation frame image including a time axis and a presentation area.

15. The information presentation apparatus of claim 14, wherein a first time axis of a first sub-presentation frame image has a time scale different from a second time axis of a second sub-presentation frame image.

16. The information presentation apparatus of claim 10, wherein when a proper location to present the specific information is shared by other information, the controlling unit presents the specific information at a vacant location allocated for different information or at the proper location by placing the specific information partly on or under the other information.

17. The information presentation apparatus of claim 10, wherein when a proper location at which to present the specific information is shared by other information, the controlling unit presents the specific information at a vacant location allocated for different information or at a location near the proper location.

18. The information presentation apparatus of claim 10, wherein when the specific information is not associated with the chronological information, the controlling unit sends to a user a warning that the specific information is not associated with the chronological information and a request for an input of the chronological information.

19. A computer-readable device encoded with computer instructions that, when executed on a computer, cause the computer to perform an information presentation method for presenting specific information in a basic presentation frame image on a display, the method comprising:
indicating a time axis in the basic presentation frame image in one direction of the basic presentation frame image;
providing a presentation area extended along the time axis in the basic presentation frame image, the presentation area being divided into a plurality of distinct sections each extending along the time axis and each presenting specific information relating to an information category;
when the specific information is associated with chronological information pertaining to the specific information and used to present the specific information in the presentation area in a chronological order, presenting the specific information in the presentation area at a location along the time axis indicated by and corresponding to the chronological information; and
when the specific information is not associated with the chronological information, presenting the specific information in an area within the presentation area that is allocated to presenting information that is not associated with chronological information.

* * * * *